United States Patent [19]
Bozer et al.

[11] 3,927,139
[45] Dec. 16, 1975

[54] METHOD OF FABRICATION OF FURAN RESIN BONDED FIBER REINFORCED ARTICLES BY SPRAY-UP TECHNIQUE

[75] Inventors: Keith B. Bozer; Lloyd H. Brown, both of Crystal Lake, Ill.

[73] Assignee: The Quaker Oats Company, Chicago, Ill.

[22] Filed: Nov. 26, 1973

[21] Appl. No.: 418,904

[52] U.S. Cl......... 260/829; 260/30.4 R; 260/30.4 N; 260/32.8 R; 260/32.8 N; 260/37 R; 260/67 F; 260/67 FA; 260/68; 260/69 R; 264/309
[51] Int. Cl.² .................... C08G 2/38; C08G 6/00; C08G 12/46; C08L 61/26
[58] Field of Search ......... 260/32.8 R, 67 F, 67 FA, 260/37 R, 30.4 R, 68, 30.4 N, 829, 69 R; 264/309

[56] References Cited
UNITED STATES PATENTS

| | | | |
|---|---|---|---|
| 2,416,038 | 2/1947 | Adams............................ | 260/67 FA |
| 2,499,275 | 2/1950 | McWhorter..................... | 260/67 FA |
| 2,749,322 | 6/1956 | Lissant............................ | 260/67 F |
| 3,043,804 | 7/1962 | Delmonte........................ | 260/67 FA |
| 3,184,814 | 5/1965 | Brown............................. | 260/67 FA |
| 3,594,345 | 7/1971 | Brown et al..................... | 260/37 R |

*Primary Examiner*—Allan Lieberman
*Attorney, Agent, or Firm*—Joseph P. O'Halloran

[57] ABSTRACT

A spray-up method of fabricating fiber reinforced furan resin bonded articles is disclosed. The method of the present invention is an improvement in the so-called "two pot" spray-up system in which a catalyst and a resin are admixed moments before the resulting catalyst-resin mixture is applied by spraying, onto a shaping surface, e.g., onto reinforcing fiber applied to a shaping surface. In a preferred disclosed method, reinforcement material, preferably glass fiber, is continuously applied in chopped form to a shaping surface, usually a metal surface, in an air stream simultaneously with a catalyst-liquid furan resin mixture which is being applied in the form of a spray. In accordance with the present invention the catalyzed liquid resin mixture is so constituted to provide a working life or bench life in which the viscosity of the liquid is substantially stable for a relatively short period of time in which the freshly resin-wetted chopped fiber reinforcement or other reinforcement can be "worked" with a roller to remove air bubbles and to increase the compaction of the reinforcement-resin mass on the shaping surface. The method is further characterized as having a rapid and thorough cure at room temperature after the working life with the result that the shaped composite can be stripped from the shaping surface within a reasonable period of time.

9 Claims, No Drawings

METHOD OF FABRICATION OF FURAN RESIN BONDED FIBER REINFORCED ARTICLES BY SPRAY-UP TECHNIQUE

This invention relates to the "spray-up" fabrication of fiber reinforced resin articles, and in particular to the fabrication of fiber reinforced furan resin articles, such as for example, glass fiber-reinforced furfuryl alcohol resin articles.

Glass fiber reinforced furfuryl alcohol resin articles are well known, and are regarded as being particularly desirable for use as vessels, containers, and other articles used in systems requiring high degree of chemical resistance, high strength, structural stability, etc. Heretofore such articles have been made by relatively cumbersome hand lay-up techniques. Prior to this invention there have been no successful, reliable, and safe methods for fabrication of such articles using the otherwise broadly applicable conventional spray-up techniques.

In conventional "spray-up" techniques, a fibrous reinforcement material such as, for example, glass fiber is chopped and applied to the shaping surface in a high velocity air stream. Simultaneously with the application of the chopped fibrous reinforcement the catalyzed resin binder is applied in spray form. It has been conventional to use such spray-up procedures with polyester resin systems, for example. In those applications in which a relatively high degree of chemical resistance is required, it is conventional to apply initially to the shaping surface a layer of catalyzed resin by spraying the resin thereon, and to immerse in and work into the initially-applied resin layer a fine veil, fabric, or a mat of fibrous reinforcement material. Chopped reinforcement-catalyzed resin spray is then continuously applied to the resin-veil surface. Immediately upon the application of the chopped fiber reinforcement and catalyzed resin binder, the freshly applied mixture is rolled with a roller, by hand, for example, to homogeneously distribute the liquid resin throughout the fiberous reinforcement, and to work out air voids and the like.

An inherent advantage in the blown, chopped fiber spray-up technique is the fact that the fibrous reinforcement material can be purchased and utilized in the form of inexpensive, easily handled and easily fed tow, or roving. Also, the two pot spray-up process of applying the fiberous reinforcement and catalyzed liquid resin binder is a continuous process as distinguished from the so-called "hand layup" techniques which have been intermittent techniques involving batch processing of catalyzed resin. Another inherent advantage of the spray-up technique is the fact that a very large amount of reinforcement and catalyzed liquid resin can be applied to a shaping surface in a short period of time. The "spray-up" techniques are particularly advantageous in the fabrication of articles on very large or irregularly shaped shaping surfaces in that it becomes very difficult to apply uniformly a pre-shaped fiber reinforcement material, such as, for example, woven roving, and the like to such surfaces.

In a typical utilization of the "spray-up" technique, e.g., in the fabrication of a vessel for use in a system requiring a high degree of chemical resistance, high strength, and high structural stability, the shaping surface can be in the form of a cylindrical mandrel which is continuously rotated at a uniform speed by suitable mechanical means while one or more operators continuously and simultaneously apply the mixture of chopped fiberous reinforcement and catalyzed resin binder. In such fabrication, for example, end caps for the vessel are typically manufactured by applying to stationary or rotating shaping element domes, to which the resin-embedded veil has been applied initially, the air-borne mixture of chopped fibrous reinforcement and catalyzed resin binder.

Thus, this invention is not directed to that aspect of the fiber-reinforced resin fabrication art known as pre-preg or as pre-mix molding, since the problems of spray-up fabrication are entirely different.

In the pre-preg technique, resin is predistributed on the fiber reinforcement, typically from a resin system dissolved in a solvent, and in which a latent catalyst is also present. Typically, the resin solvent system is processed to evaporate the solvent, and to leave a coating of binder on the pre-shaped fibrous reinforcement. Typically the resulting resin is of relatively high viscosity. The resin-coated fiberous reinforcement material is then typically stored under refrigeration, and is eventually pressed against the shaping surface and is heat cured thereon.

In pre-mix molding, a latent catalyst, resin, and reinforcement, etc., not in web form are usually prepared by bulk admixing of these ingredients by the molder prior to the time of use. This process is also known as bulk molding or dough molding, and is typically used in pressure molding fabrication of solid articles as distinguished from laminates, panels and the like. In bulk molding, at least a portion of the shaped mass is heated somehow to trigger the catalyst, e.g., the mold is heated.

In hand layup fabrication the entire process is basically a batch process in which the layers of resin and reinforcement are applied alternately.

In hand layup work, and in pre-preg techniques, relatively high viscosities are desirable, although the hand layup techniques use resins which are far less viscous than those resins which are left on the reinforcement in the pre-preg techniques.

In spray-up work, however, it is essential that the initial viscosity of the liquid resin be low enough to provide for the formation of a relatively fine spray of catalyzed resin, to provide ready penetration and wetting by the liquid throughout the fiberous reinforcement, and to provide minimum tendency of the resin to remain adhering to the roller or other working tool. When the viscosity is too high, the rollers tend to adhere to the resin in the applied reinforcement material-liquid-resin mass, with result that the highly viscous reinforcement material-liquid-resin mass can be disrupted or literally torn apart as the roller is withdrawn therefrom. In addition to developing minimal cohesion between the applied fiber-resin layer and the resin-wetted working roller, the lower viscosity resins enhance the working out of air bubbles from the fiber-resin layer.

On the other hand, relatively high viscosities are desirable inasmuch as less shrinkage is encountered upon cure and more manageable or more tolerable exotherms are usually encountered on the shaping element when higher viscosity resins are employed. Relatively high initial viscosity is characteristic of liquid resins in which the early stage of polymerization have been carried out at least to some extent in a suitable reactor. Naturally, this controlled advancement of the resinification or condensation reaction involves generation and dissipation of whatever exotherm is generated during that particular degree of advancement. Consequently, the extent of polymerization or condensation which can be encountered after that resin is catalyzed and applied to the shaping element is diminished by the degree to which the controlled precondensation is carried out in a reactor. Hence, the more advanced resins, that is, resins having high viscosity, relatively speaking, are also characterized as exhibiting diminished exotherms during the course of cure of the fabricated article.

It has been found that the success in the invention of fabrication techniques for new applications for catalyzed resin systems depends to a great extent on discovering a proper balance of interrelated operating parameters such as residual exotherm, catalyst activity, etc. Thus, it will be appreciated that a viscosity of the liquid resin, in spray-up fabrication of fiber reinforcement resin, that is, the viscosity at the moment of contact between the resin and the fiber, is an extremely important factor or parameter in determining the success of the operation not only because of physical attributes, but also because viscosity is a parameter generally looked upon as indicating the extent of residual exotherm.

Spray-up techniques differ dramatically from pre-preg and hand layup techniques with respect to catalyst requirements. Pre-preg catalysts must remain dormant in the resin for long periods of time and are usually activated by elevated temperatures. Hand layup requires fast-curing catalyst resin systems, and yet requires the substantial working life to allow for the application of shaped fiberous reinforcement. For example, it must allow for the application of the woven roving, or the like, and, in addition, allow additional time in which the applied fiberous reinforcement can be "worked into" the resin with a roller, or the like. However, using some known furfuryl alcohol resin catalyst, e.g., aniline hydrochloride, an immediate and abrupt increase in the viscosity of the liquid resin is encountered. Hence, when such catalysts and liquid resins are admixed, the liquid resin system is in a state of rapid and immediate change in viscosity and this abrupt change in viscosity continues during the so-called "bench life."

Hence, during the relatively short "bench life" of the catalyzed resin system in the hand layup technique, the resin can be regarded as "workable," even though the resin is immediately and abruptly increasing in viscosity. Upon being mixed with the catalyst the resin may be relatively fluid and free flowing and, shortly thereafter, it may exhibit a relatively high viscosity. In the hand layup techniques, generally speaking, it has been common for the viscosity of the resin to double upon being catalyzed, and before it is applied to the shaping element. Even in connection with the more effective latent catalysts such as those described in our previous patent application the "bench life" is not indefinite, and, therefore, it is essential that the entire catalyst resin mixture be removed from the container and be used as a thin layer or be discarded prior to the gellation of the catalyzed resin mixture.

Moreover, the exotherm encountered in the catalyst-resin pot can be substantial, with the result that the rapid increase in viscosity is aggravated in the pot, and, in some instances, the temperatures can exceed the temperature at which steam is evolved and dangerous eruptive spattering can be encountered.

Consequently, in the essentially batch processes such as the heretofore available "hand layup process", the utilization is more personnel intensive in that a larger number of people may be required in order to assure the complete utilization of the prepared catalyzed resin during the "bench life."

It has been suggested heretofore that the catalyzed furan resin systems which were conventionally used in hand layup fabrication be applied to the shaping surface by means of a pressurized spray apparatus. This kind of spray-up fabrication is known as "one-pot" spray-up, because both the catalyst and resin are admixed and placed into a single reservoir batchwise. However, this kind of spray method of application was found to be extremely dangerous when catalyzed exotherm-reacting resins were employed. For example, the relatively short "bench-life," and the exotherm encountered in such systems near the end of the "bench life" resulted, in some instances, in accidents. For example, it is reported that one operator, realizing that a substantial portion of catalyzed resin remained in the reservoir and spray equipment near the end of the safe "bench life" quickly withdrew the pump intake head from the catalyzed resin in the reservoir and, in an attempt to quickly clean out the intake of the pump, placed the intake components in a bucket of acetone. However, the resin exotherm went out of control, and, upon being immersed in the acetone, the vigorous exotherm of the resin mass immersed in the acetone bath resulted in an explosion of sufficient force to blow the pump head out of the acetone bath.

One of the purposes of the present invention is to provide a "spray-up" technique by which catalyzed exotherm-reacting furfuryl alcohol resins can be safely applied to shaping surfaces to form a composite layer thereon, and the present invention provides a method which utilizes conventional "two-pot" spray-up equipment.

In "two pot" spray-up techniques the resin stream is continuously catalyzed at the moment of, or at the moment prior to, discharge from the spray-up equipment, and not substantially before. In some types of commercially available spray-up equipment, a stable uncatalyzed fluid resin is pumped into a spray head while a liquid catalyst is likewise carried in a separate stream to the spray head. In some instances, the liquid resin and catalyst is pumped out of the spray head under the hydraulic pressure of the liquids in the relatively small mixing chamber in the spray head. The design of the mixing chamber is such as to promote efficient mixing of the catalyst and resin in the spray head immediately prior to discharge from the common spray-generating orifice. In other instances, the resin in the spray head is blown from the spray-generating orifice by a high pressure, high velocity air stream which is introduced into the head. In this instance, for example, the liquid catalyst is conveyed by means of a flow meter into the high pressure, high velocity air stream in which it is conveyed to the head for mixing with the resin immediately prior to the discharge from the spray head. Typically the volume of the mixing chamber in the spray head is so small that the residence time of the respective liquids or of the resulting mixture in the head is in the order of a few seconds or less.

In the two pot spray-up method, therefore, the catalyzed liquid resin is generally applied to the shaping surface immediately after the moment wherein the resin is admixed with the catalyst, and the quantity of material "remaining" in the spray head is extremely small. The spray head can be "flushed clean" upon discontinuing one or other of the ingredients and preferably, the head is fitted with a flush line whereby a suitable solvent can flush out the head immediately before and after the catalyzed resin is fed therethrough.

An important aspect of the two pot spray-up methods is the fact that these methods do not involve a time-crisis which occurs whenever a relatively large batch of catalyzed resin is mixed; nor do they involve the intensive need for personnel to utilize, or indeed to safely and quietly dispose of the large pre-mixed batches of catalyzed resin. Unlike the one pot methods, the two pot spray-up methods can utilize resin-catalyst systems which have relatively fast cure rate at ambient temperature. Thus, in the two pot spray-up techniques, catalysts regarded as extremely "fast" could, in theory, be utilized.

However, conventional "fast" furfuryl alcohol polymerization catalysts such as hydrochloric acid, sulfuric acid, phosphoric acid, p-toluenesulfonic acid, etc., were found to be unsatisfactory for use in spray-up equipment from the point of view of corrosivity of the metal components in the spray equipment, or from the point of view of not reliably providing sufficient exotherm control to wholly prevent blistering, separation and other defects generated during cure by uncontrolled exotherm.

Also, in spite of the many well known advantages of furan resin systems with respect to the high degree of chemical resistance, and structural stability there has been no satisfactory catalyzed furan resin system heretofore known or suggested for use in the two-pot spray-up operation.

It is an object of the present invention to provide a spray-up method of fabricating fiber reinforced resin articles which is characterized in part by the continuous mixing of special furan resins and specific catalysts at the instant prior to the continuous application of the resulting mixture to the shaping surface.

It is another object of the present invention to provide a method of fabricating fiber reinforced furan resin articles such as, for example, furfuryl alcohol resin articles, which is characterized in part by the provision of a very short finite working time, throughcure at ambient temperature conditions, and good strippability in reasonable periods of time.

It is another object of the present invention to provide a method of fabricating fiber reinforced resin articles which is characterized by a fast but controlled room temperature cure after a very short initial working period has elapsed, with the result that the freshly cured articles exhibit excellent strippability and hardness, and rapid development of chemical resistance.

It is an additional object to provide a method in which shaped composite articles can be fabricated and cured at ambient conditions in a reasonable period of time to a condition of good strippability, and in which the resulting articles, provide rapidly developing, chemical resistance, and can be heated thereafter to provide even greater chemical resistance.

It is a further object of the present invention to provide a method of fabricating fiber reinforced resin articles in which the catalyzed furan resin system can be applied using conventional "two pot" spray-up equipment, of the type in which catalyst and resin is continuously admixed in a small chamber in the spray head at the moment prior to discharge of the catalyst resin spray, and in which there is minimal corrosion to the metal components in the conventional spray-up equipment as a consequence of contact of the equipment with the components of the catalyzed resin system of the present invention.

It is a further object of the present invention to provide a method of fabricating fiber reinforced furan resin articles by a spray-up technique in which the liquid catalyst system provides improved "room temperature cure" characteristics, and which does not require the use of ovens, heat lamps, or other similar devices to reduce cure cycles.

It is another object of the present invention to provide a two pot spray-up resin system in which the catalyst employed does not inherently cause intolerable conditions because of the odor or character as a lachrymator.

All these and other objects which will be apparent hereinafter are achieved in accordance with the present invention in which the catalyzed furan binder system employed comprises for example, a liquid furan resin diluted with furfural and homogeneously having admixed therein an effective catalytic amount of special liquid organic acid chloride catalyst selected from the group lauroyl chloride, and o-phthaloyl chloride and mixtures thereof.

The terms "effective catalytic amount," "percent hydrolyzable chloride," and "furan resin" are defined hereinafter.

The term "effective catalytic amount" means that amount of catalyst which will effectively cure the special resin at room temperature to render the laminate strippable within 24 hours. Unless otherwise indicated, catalyst concentrations are expressed as percent hydrolyzable chloride, and an amount between 0.5 to 2 percent inclusive expressed as percent hydrolyzable chloride based on the weight of the catalyzed resin mixture, is effective and about 1 percent is preferred. However, higher concentrations of catalyst can be employed but the higher concentrations offer no added advantages in spite of increased costs.

The "percent hydrolyzable chloride" in a catalyst in accordance with the present invention is calculated on the basis of theoretical stoichiometry and on the structural formula of the acid chloride in question. For the purpose of this calculation the chlorine atoms attached directly to a carbonyl carbon are to be regarded as hydrolyzable. Thus, the amount of hydrolyzable chlorine in a quantity of the organic acid chloride can be calculated by the formula: (weight of acid chloride) X [(total atomic weight of hydrolyzable chlorine in formula of acid chloride) ÷ (formula weight of the acid chloride)]. The amount of hydrolyzable chlorine thus calculated divided by the weight of the binder, multiplied by 100 gives the percent hydrolyzable chlorine in the binder containing that amount of catalyst.

A preferred acid chloride catalyst ingredient is an admixture of o-phthaloyl chloride homogeneously admixed with dimethyl phthalate (5–25%). This liquid mixture is used as a catalyst ingredient, preferably, because it has a lower freezing point and is easily metered at reproducible levels due to its desirable handling characteristics. It is noted that the catalyst ingredient must, in accordance with this invention be a liquid. Hence, it is contemplated that the acid chlorides can be dissolved or otherwise homogeneously dispersed in an inert liquid for use in this invention. However, it is preferred that the acid chloride be admixed with the resin as a highly concentrated solution or as a pure compound. Also, while o-phthaloyl chloride is suitable for use as the catalyst in accordance with the present invention, m-, or p-phthaloyl chloride are not. However, commercially available o-phthaloyl chloride containing minor amounts of m- or p-phthaloyl chloride e.g. less than 10 percent, can be used as the phthaloyl chloride catalyst.

As used herein, the term "liquid furan resin" is intended to mean a liquid partially prepolymerized resin prepared from ingredients including compounds having one or more furan rings therein, such as, for example, furfuryl alcohol or furfural and in which there is no more than 1 mole of any other respective polymerizable ingredient per mole of furan ring in the furan ring-containing ingredients. For example, a furfural-phenol resin copolymerized with formaldehyde for use in accordance with this invention could contain no more than 1 mole of phenol and 1 mole of formaldehyde per mole of furfural.

The preferred special liquid furan binder contemplated for use in accordance with the present invention includes from 5 to 25 percent furfural and a furan resin selected from the group including liquid furfuryl alcohol resin, furfuryl alcohol-formaldehyde resin, furfuryl alcohol-furfural-formaldehyde resin, furfuryl alcohol phenol resin, furfuryl alcohol-urea-formaldehyde resin, furfuryl alcohol-urea-phenol resin, furfural phenol resin, and the like and mixtures thereof wherein the resins are partially prepolymerized, and the binder after dilution of the resin with furfural, and with furfuryl alcohol, if the latter is to be present, has a viscosity between 200 cps and 1000 cps inclusive at 25°C. Preferred binders for spray-up in accordance with this invention have a viscosity between about 250 cps and 550 cps inclusive at 25°C.

The special furan binders for use in accordance with this invention must include from about 5-25 percent by weight inclusive furfural, preferably 10-25 percent inclusive furfural as monomeric furfural, and can include from 0-35 percent inclusive preferably 10-20 percent inclusive, of furfuryl alcohol as monomer based on the weight of the binder. Thus, it is noted that furfural and furfuryl alcohol monomers are not contemplated for use as resin binders in accordance with the present invention although it is to be understood that these monomers may be present within the limits set forth immediately hereinbefore in the special furan resin mixtures which are to be used in accordance with this invention. Preferably, the polymeric portion of the resin binder mixture which is prepared for use in accordance with the present invention is "advanced," or prepolymerized in an initial controlled polymerization reaction to a predetermined viscosity range, and is then admixed with the specified amount of furfural to a viscosity in the range 200-1000 cps inclusive at 25°C.

Preferred resins for use in accordance with the present invention are described in U.S. Pat. Nos. 3,594,345 and 3,681,286 issued to Brown and Watson for "Fiberglass Laminates Containing Furfuryl Resin Binder." These preferred resins comprise furfuryl alcohol-formaldehyde resins containing formaldehyde-furfuryl alcohol ratio of about 0.25:1.0. It is preferred that in the ingredients charged to the pre-polymerization reactor, the mole ratio of formaldehyde to furfuryl alcohol be from 0.20 to 0.60 moles of formaldehyde per mole of furfuryl alcohol. Furfural, in an amount between about 5 and 25 percent of the final composition is added in the form of monomer after the prepolymerization and distillation of the furfuryl alcohol formaldehyde resin portion.

It is preferred that in partially prepolymerized binder, we mean that the binders have been pre-resinified to a particularly controlled extent prior to use in accordance with the present invention. The pre-resinification of furfuryl-alcohol containing binders is readily accomplished in the presence of an acid catalyst. The pre-resinisification of furfural-phenolic resins can take place in the presence of an alkaline catalyst such as, for example, hydroxides of alkali metals and alkaline earth metals, and carbonates of alkali metals, such as, for example, calcium hydroxide, sodium hydroxide, sodium carbonate, potassium carbonate, etc.

Any conventional acid catalysts may be employed to accomplish the pre-polymerization or pre-resinification of the binders used in this invention. Suitable catalysts include, for example, inorganic and organic acids, such as hydrochloric acid, sulfuric acid, nitric acid, orthophosphoric acid, benzenesulfonic acid, toluene sulfonic acid, naphthalene sulfonic acid, benzoic acid, salicylic acid, acetic acid, propionic acid, maleic acid, oxalic acid, malonic acid, phthalic acid, lactic acid, citric acid, etc. Suitable acid catalysts also include metal chloride such as, for example, Freidel-crafts type catalysts such as ferric chloride, aluminum chloride, zinc chloride, ammonium chloride, as well as boron trifluoride, etc. Suitable acid catalysts for the prepolymerization can include, for example, organic acid anhydrides such as maleic anhydride, succinic anhydride, glutaric anhydride, etc. Other examples of satisfactory conventional acid catalysts for the pre-polymerization or pre-resinification includes mineral acid salts of urea, thiourea, substituted urea such as methyl urea, acetal urea, benzyl urea, phenylthiourea, etc. Mineral acid salts of other members of the urea system are also included, for example, guanidine, creatine, quanoline, etc.; mineral salts of ethanol amines such as mono-, di-, and triethanolamines; and mineral acid salts of amines such as methylamine, trimethylamine, aniline, benzylamine, morphylamine, etc.

When the desired degree of advancement is reached, the catalyst is neutralized by a suitable base, and the water and low boiling constituents are distilled off. Generally speaking it is preferred that mineral acids and other strong acids not be used to pre-polymerize the resins, because of the risk that, without adequate heat dissipation capability, such pre-polymerization may develop dangerous, uncontrollable exotherm. A preferred pre-polymerization catalyst is oxalic acid, and a preferred base for neutralizing this pre-polymerization catalyst is triethanolamine.

The pre-resinification or pre-polymerization is stopped at an intermediate fluid stage. In the case of furfuryl alcohol resins, furfuryl alcohol-formaldehyde resins and furfuryl alcohol-furfural-formaldehyde resins, the preadvancement of the resin is preferably continued to such a point that, after neutralization of the catalyst, stripping of water and low boiling constituents therefrom, the resulting viscosity is in the range between 10,000 and 25,000 cps at 25°C. In the case of furfuryl alcohol-urea-formaldehyde resin, these are preferably advanced to such a degree that after neutralization of the catalyst and after the water and low boiling constituents are "stripped" therefrom, the resulting viscosity is in the range between about 500 and 1000 cps inclusive at 25°C. In the case of furfural phenolic resins, the polymerization, with or without formaldehyde present, is preferably continued or advanced to such a degree under alkaline catalysis, for example, that after the catalyst is neutralized and the water and low boiling constitutents are stripped therefrom, the resulting viscosity of the prepolymerized resin is in the range between about 500 and 10,000 cps at 25°C. inclusive.

In accordance with the present invention, in the preparation of resins for use in this invention, the resulting initially prepolymerized resin is then diluted with furfural, that is, furfural monomer, until a viscosity in the desired range, e.g., 200–1000 cps at 25°C., and preferably 250–450 cps at 25°C., is achieved, the amount of furfural being sufficient to provide between 5 and 25 percent by weight of the resulting binder mixture.

Inasmuch as the two-pot spray-up equipment used to carry out the method of the present invention is conventional and widely known and used at the present time particularly with polyester resins, etc., such apparatus constitutes no part of the present invention. Hence, a detailed description of such apparatus will not be set forth herein. In summary, typical conventional equipment comprises a separate respective reservoir or "pots" for a liquid catalyst, and for a liquid catalystcurable resin binder, respective separate pumping means for conveying under pressure respective separate streams of catalyst and binder to a relatively small volume mixing chamber, and means for immediately discharging the resulting admixture through a spray-generating head in the form of a spray into a discharge zone.

Typical "high pressure" equipment will provide pressures of 1000 psi and higher in the spray head, and typical "low pressure" equipment will utilize pressures less than 1000 psi in the spray head, such as for example 200 to 400 psi. The spray orifice will typically be easily connected and disconnected, so that any one of a large selection or spray openings can be used. For example, respective spray nozzles deliver resin at from 1 pound per minute to about 10 pounds per minute at a given pressure are readily available. Typically, the retention time of the catalyzed resin binder mixture in the mixing chamber, spray head and nozzle is extremely short — less than 5 seconds and usually less than one second. No substantial exotherm is observed in the mixing chamber, spray head or nozzle because of the small retained volume, extremely high feed rate, relatively speaking, and extremely short retention time.

Preferred embodiments of the invention also utilize conventional apparatus with separate respective means for blowing a stream of particulate solid reinforcement such as, for example, chopped glass fibers. The spray means and fiber-blowing means are typically movable and capable of operation by an operator whereby the discharge zone can be moved at will by the operator, and whereby the discharge zone, containing the catalyzed resin binder mixture and particulate solid reinforcement can be directed at will by the operator against a shaping surface.

Also, in accordance with the present invention, it is contemplated that the catalyzed resin mixture can be sprayed on a shaping surface to form a layer of liquid catalyzed resin thereon, and that a solid reinforcement material, such as, for example, chopped roving, woven roving, or the like can then be imbedded in the initially deposited layer. It is also contemplated, for example, that the sprayed catalyzed resin mixture can be applied to a woven reinforcement to saturate the woven reinforcement immediately prior to application of the woven reinforcement to a shaping element. It is also contemplated, in accordance with the present invention, that a layer of liquid catalyzed resin can be applied to a shaping element, and that a pre-shaped solid web, woven roving, veil, foraminous mat, fabric, or the like, can then be applied to the initially applied liquid binder layer. It is also contemplated that, to the exterior surface of an initially applied solid reinforcement, additional sprayed catalyzed resin mixture, in accordance with the present invention, can be applied. Thus, in its broadest aspects, this invention can be regarded as providing a spray-up catalyzed furan binder, and a method of providing a furan binder in a form and having characteristics suitable for spray-up fabrication of articles.

We have discovered that, in accordance with the present invention, when the defined acid chlorides are used to catalyze these special furan binder systems described hereinbefore, the composite layer which is freshly applied to the shaping surface does not change in viscosity unduly during the short finite working time until gellation commences to a substantial degree. Thereafter, the rate of reaction proceeds at a very fast pace with the result that the shaped composite layer develops sufficient hardness in sufficiently short period of time to render the shaped composite form readily strippable. However, the cure rate proceeds at a fast pace which is automatically and inherrently controlled, however, to such an extent that the resulting composite article is not subjected to blistering, lamina separation, or other structural and process defects which are a natural consequence of excessive exotherm during cure. Upon further room temperature cure, high strength, and chemical resistance, e.g., corrosion resistance, is acquired.

In addition, the two-pot spray-up method of this invention does not incur chemical corrosion of the conventional spray-up equipment heretofore used only for the manufacture of non-furan articles.

In spray-up test procedures a panel approximately 3 feet by 3 feet square is preferrably fabricated. In these tests, a mylar film can be supported on a smooth metal surface which serves as the shaping surface. A thin layer of catalyzed resin is then applied as a spray to wet the film. In a typical procedure, for example, a conventional spray-up apparatus can be used, such as, for example, a Venus (T. M. Venus Products, Inc., Kent, Washington) hydraulic injection system (HIS). In such an apparatus, the liquid resin is metered to a small mixing chamber in the spray head, and the liquid catalyst is also metered in correct ratio to the resin to the mixing chamber in the spray head, and the admixed catalyst and resin are discharged under pressure from the spray-generating orifice. Operating under independent controls is a fiber chopper in which a continuous tow or roving is advanced mechanically and chopped into the desired length, e.g. ¾ inch – ½ inch length, and discharged therefrom in a high velocity air stream. The catalyzed resin spray pattern generated by the spray head is oriented to approximately coincide with the discharge pattern of the chopped glass reinforcement.

In the procedure of the tests, therefore, during the initial application of the catalyzed resin mixture, that is, the "gel coat," the chopper is not activated. After the application of a thin layer of catalyzed resin to wet the mylar film a single layer or ply of 10 mil (nominal) "C" glass chemical resistant surfacing veil is applied, for example, to the film of resin and this is rolled with a serrated or corrugated roller until the resin pre-coat has thoroughly wet all the glass, and all air is removed, and the veil has become embedded in the resin film. Immediately thereafter the spray head is again activated, and the glass reinforcement fiber chopper is activated and the sprayed and blown mixture of catalyzed resin and chopped reinforcement fiber is applied to the embedded veil layer. The controls on the glass chopper and the catalyst-resin injection systems are adjusted to provide a ratio of the components wherein approximately 25–30 percent, for example, of the weight of the applied composite material is glass fiber reinforcement, the balance being catalyzed resin.

This process is continued until a composite layer consisting of a veil, and a layer of desired thickness of resin and chopped fiber reinforcement is applied. Optionally, the exterior surface of the resulting formed composite layer can be sprayed with a catalyzed resin in accordance with this invention, and a second "finish" ply of veil be incorporated into the final catalyzed resin coating as described hereinbefore in connection with the surface mat.

The purpose of the veil against the shaping surface is usually to prevent the protrusion of glass fibers from the composite layer. It is believed that the protrusion of fibers from the composite layer may serve as a wicking site, with resulting decrease in long term chemical or corrosion resistance at that site.

The "cure time" starts at the time at which the last composite is applied to the shaping surface. It requires about 3 minutes to prepare the 3 feet by 3 feet test panel approximately ⅛ inch thick.

The method of the present invention is not limited to the above procedure, nor is it limited to the use of glass fiber reinforcement, although glass fiber reinforcement is preferred.

As used herein and in the pendent claims, percent are expressed in percent by weight based on the weight of the composition under discussion, unless otherwise noted; all weights are in parts by weight, all percents are in percent by weight based on the weight of the composition referred to, and all temperatures are expressed in degrees centigrade.

The following examples are provided for illustration only and the invention is not to be unduly limited thereby.

EXAMPLE 1

A furfuryl alcohol resin was prepared as in Example 2 in U.S. Pat. No. 3,594,345 except that the final distillation step is terminated sooner to provide a lower viscosity (e.g. 16,000 cps at 25°C.) whereby dilution with about 25 percent furfural monomer provides a final viscosity of about 400 cps. This diluted resin is then placed in a container in a constant temperature bath until it is precisely 25°C. A 150 parts by weight sample of this resin is admixed with an acid chloride in an amount sufficient to provide 1 percent hydrolyzable chloride based on the weight of the resin. This procedure is repeated to test respective acid chlorides to determine the gel time. The gel time is determined by placing the 150 grams of the catalyzed resin system in an eight ounce capacity paper cup as indicated above, placing a "Randolph Gel Timer — 100" stirrer therein, and connecting the stirrer to the Randolph gel timer. The operation of the timer is commenced immediately upon addition of the resin catalyst and, as soon as the viscosity of the resin-catalyst system exceeds approximately 50,000 cps., the gel timer shuts off automatically. The times observed and the identity of catalysts tested are set forth in Table I below.

Table I

| Catalyst | Gel Time (Mins.) |
|---|---|
| O-Phthaloyl Chloride | 8.6 |
| Lauroyl Chloride | 1.8 |

EXAMPLE 2

The purpose of this example is to illustrate the use of the resin produced in accordance with Example 1 in a procedure in accordance with the present invention for making composite articles. Using the procedure described immediately hereinafter, test panels approximately 3 feet by 3 feet square were fabricated.

In each of the tests of this example, a Mylar film was applied to a smooth surface of a steel sheet approximately 1/8 inch thick. A thin layer of catalyzed resin is then applied as a spray to wet the Mylar film. In the procedure of Example 2, a Venus hydraulic injection system is used. In the series of tests reported in this example, the liquid resin is metered into a small mixing chamber in the spray head, and the liquid catalyst employed is o-phthaloyl chloride. The catalyst is fed at a respective catalyst level which is reported herein in connection wtih Tests 1–5 as percent catalyst both as percent hydrolyzable chloride, and as weight percent catalyst based on the weight of the catalyzed resin mixtures.

In this apparatus, therefore, the liquid resin is metered into a small mixing chamber in the spray head and the liquid catalyst, namely phthaloyl chloride, is metered in correct ratio with the resin in the mixing chamber in the spray head, and the admixed catalyst and resin are discharged under pressure from the spray generating orifice. A continuous tow of glass fiber roving (Owens Corning 881) is advanced mechanically and chopped to lengths of 1¼ inches and discharged therefrom in a high velocity air stream. The catalyzed resin spray pattern generated by the spray head is oriented to approximately coincide with the discharge pattern of the chopped glass reinforcement.

In the procedure of each of the tests reported in this example, during the initial application of catalyzed resin mixture, the glass chopper is not activated. After the application of a thin layer of catalyzed resin to wet the mylar film a single layer or ply of 10 mil (nominal) "C" glass chemical resistance surfacing veil SM40-10 (Johns-Manville Trade Designation) is applied to the liquid film of resin. This veil is then rolled with a serrated or corrugated roller until the resin coats and thoroughly wets all the glass, and all the air bubbles appearing are removed, and the veil has become embedded in the resin film. Thereafter the spray head is reactivated and the glass reinforcement fiber chopper and blower are activated and the sprayed and blown mixture of catalyzed resin and chopped reinforcing fiber is applied to the embedded beil layer. The controls on the glass chopper and catalystresin injection system were adjusted to provide a ratio of the components wherein approximately 25–27 percent, for example, of the weight of the applied composite material, after cure, is glass fiber reinforcement, the balance being catalyzed resin.

During the spray-up of the catalyzed resin and fiberous reinforcement, the Venus spray gun is maintained approximately 18 inches from the shaping surface, and the gun is manually oscillated back and forth across the entire width of the shaping surface while the gun is moved slowly in the direction transverse to the oscillating motion whereby the gun passes back and forth along a swath as it moves in a first direction, and then the gun is moved in oscillating motions transverse to the direction of the first oscillation as the gun is moved generally along swaths which are transverse to the direction of the first swaths.

As the chopped fiber-catalyzed resin mixture is supplied to the surface, it is "worked" by rolling a serrated or corrugated roller thereover until the resin has thoroughly wet all the fiberous reinforcement, all air is removed, and the chopped reinforcement becomes embedded in the resin film.

The procedure continued until a composite article consisting of a veil, and a uniform layer, of desired thickness, consisting of resin and of chopped fiber reinforcement, and a second veil, identical to the first veil provides a total thickness of approximately ⅛ inches. In these tests, no additional resin is applied to the latter, outer veil because sufficient resin is present to thoroughly wet the latter veil upon working of the outer veil with a roller in the usual manner. This procedure is repeated five times in separate respective tests to produce a sereis of test panels, and each of the panels produced in accordance with this procedure is tested and the results of these tests are reported in Table II herein.

In the data reported in TAble II, the term "working time" refers to that amount of time, in minutes, after the last application of resin and catalyst to the shaped composite, during which the resulting layer can be "worked" with a corrugated or serrated roller. At the end of the working time, the resinfiberous mass tends to adhere to the roller with such tennacity that the pulling or rolling of the roller across the surface results in the tearing apart, or separating, of the composite resin-chopped fiber reinforcement from the shaping surface, disrupting the integrity of the laminate.

In Table II the term "tack-free time" means that length of time, in minutes, after the last application of resin and chopped fiber reinforcement after which one's fiber can be placed on the resulting laminate and removed therefrom without having any resin whatsoever adhere to one's finger.

The term "strip time" is that amount of time, in hours, after the last catalyzed resin-chopped fiber reinforcement is applied at which the shore D hardness of 55-60 is achieved under ambient room temperature cure conditions while the laminate remains in contact with the metal shaping surface.

Table II

| Catalyst Level Vs. Operating Parameters | | | | |
|---|---|---|---|---|
| Weight Percent Catalyst as Hydrolyzable Chloride | Weight Percent Catalyst | Working Time (min.) | Tack-Free Time (min.) | Strip Time (hours) |
| 0.96 | 2.75 | 18 | 35 | 3 |
| 1.05 | 3.0 | 14 | 30 | 2.5 |
| 1.14 | 3.25 | 13 | 26 | 2.5 |
| 1.22 | 3.5 | 12 | 25 | 2.0 |
| 1.31 | 3.75 | 12 | 23 | 1.5 |

To further exemplify the excellent strippability of the laminates produced in accordance with the spray-up method of the present invention, when shore D hardnesses of 55-60 are achieved (at the strip time reported in Table II), not only can the laminate be separated from the metal shaping (and supporting) surface without disruption of the laminate, but moreover, the mylar film can be peeled from the resulting laminate without any disruption thereof.

EXAMPLE 3

The purpose of this example is to illustrate the development of advanced hardness upon ambient room temperature by the laminates produced in accordance with the present invention.

The procedure of Example 2 is repeated, using the resin produced in accordance with Example 1, to produce a series of test laminates each at respective catalyst levels. In the Example, however, the mylar film with the attached laminates are stripped from the metal shaping surface after approximately 1 ½ hours, in each instance, and supported on flat plywood. The mylar film is stripped from the laminate at approximately 16 hours, in each instance. The hardness development is observed on the smooth side and rough side from day to day, in this series of tests. The smooth side results are reported in Table III herein, and the rough side results are reported in Table IV herein.

EXAMPLE 4

The purpose of this example is to illustrate the flexural strength properties of the composite panels produced in accordance with the present invention.

The procedure of Example 2 is repeated using the same resin produced in accordance with Example 1, and in this series of tests, each series utilized a different respective catalyst level as reported in Table IV herein (as weight % catalyst). In each of the tests of this example, the mylar sheet and laminates are removed from the metal shaping element at approximately 1 ½ hours, and the mylar stripped from the resulting composite laminate after approximately 16 hours. Samples of the panels in each of the respective series were segregated for separate flexural strength tests: one series of tests in which the respective panel is post-cured for 2 hours in an oven at 180°F.; and the other panels of each series are tested after room temperature cure until a Barcol hardness of 35 is reached, at which time they are tested for flexural strength. The flexural strength is determined in accordance with the ASTM Procedure D790.

The results of the tests of this example are reported in Table V herein.

Table III

Hardness* Development Vs. Time "Smooth Side"

| 2.5% Cat. Hardness/Day | | 3.0% Cat. Hardness/Day | | 3.5% Cat. Hardness/Day | | 4.0% Cat. Hardness/Day | |
|---|---|---|---|---|---|---|---|
| 80–90/1 | day | 74–84/1 | day | 85–90/1 | day | 78–86/1 | day |
| 82–90/2 | " | 85–90/2 | " | 85–92/2 | " | 11/2 | " |
| 4/5 | " | 9/5 | " | 16/5 | " | 18/3 | " |
| 5/6 | " | 14/6 | " | 23/6 | " | 27/6 | " |
| 9/7 | " | 18/7 | " | 28/7 | " | 29/8 | " |
| 14/8 | " | 20/8 | " | 30/8 | " | 32/9 | " |
| 21/13 | " | 29/13 | " | 33/13 | " | | |
| 28/19 | " | 35/19 | " | 35/15 | " | | |

Table IV

Hardness* Development Vs. Time "Rough Side"

| 2.5% Cat. Hardness/Day | | 3.0% Cat. Hardness/Day | | 3.5% Cat. Hardness/Day | | 4.0% Cat. Hardness/Day | |
|---|---|---|---|---|---|---|---|
| 75–90/1 | day | 75–89/1 | day | 80–85/1 | day | 80–87/1 | day |
| 79–88/2 | " | 80–90/2 | " | 9/2 | " | 20/2 | " |
| 9/5 | " | 16/5 | " | 24/5 | " | 25/3 | " |
| 16/6 | " | 22/6 | " | 30/6 | " | 36/6 | " |
| 18/7 | " | 26/7 | " | 33/7 | " | 42/9 | " |
| 25/8 | " | 32/8 | " | 34/8 | " | | |
| 35/12 | " | 35/11 | " | 35/9 | " | | |
| 39/19 | " | 42/19 | " | 38/13 | " | | |
| | | | | 43/19 | " | | |

*Underlined Hardness Values = Shore D Range
All others are expressed as Barcol range.

Table V

Flexural Properties at Various Catalyst Levels

| % Catalyst | Room Temperature *1 Cured Flexural Strength | Post Cured* Flexural Strength |
|---|---|---|
| 2.75 | 12,200 psi | 16,000 psi |
| 3.00 | 17,500 | 16,500 |
| 3.25 | 16,400 | 16,700 |
| 3.50 | 16,600 | 19,500 |
| 3.75 | 16,200 | 15,500 |

*1 - room temperature cured until hardness of 35 Barcol is reached.
*Postcure - 2 hours at 180°F.

EXAMPLE 5

The purpose of this Example is to illustrate the use of another resin in accordance with the present invention and to compare that resin with a similar resin not in accordance with the invention.

Furfuryl alcohol is admixed with water in an amount of 10 percent by weight based on the weight of the furfuryl alcohol, and the resulting admixture is charged to a reactor which is equipped with a reflux condenser, temperature sensing and indicating means, stirrer, and steam jacket heating means.

The mixture is then admixed with incremental amounts, a 10 percent aqueous oxalic acid solution in sufficient total quantity to adjust the pH to 2.0 to 2.1. The mixture is then brought to reflux conditions, and the viscosity increase is followed with a resin cup (same as used in Example 1 hereinbefore). This cup is known in the trade as a "Durez" cup which has a three-thirtysecondth aperture in its bottom and which is filled to overflowing for the purposes of the test. As the liquid drains through the bottom aperture, the top level passes a pre-set mark on the side of the cup, and the viscosity "time" is the amount of time (drain time) it takes for the liquid to drain from the pre-set mark to empty the cup. When the drain time had increased 12½ percent the resin is regarded as having been pre-polymerized to the preferred degree, and the mixture is neutralized with aqueous sodium hydroxide solution to adjust the pH approximately 5.8. The product was then distilled under partial vacuum until the undiluted viscosity at 25° C. is 15,000 cps (Brookfield viscometer).

The resulting product is then split into two batches, and one batch is diluted with furfural in an amount sufficient to provide 21.3 percent furfural based on the weight of the final admixture, wherein the viscosity of the resulting admixture is approximately 370 cps at 25°C.

The other batch is diluted with no furfural, but is diluted with furfuryl alcohol in an amount sufficient to provide 26 percent furfuryl alcohol by weight based on the weight of the resulting admixture, wherein the resulting admixture has a viscosity of approximately 367 cps at 25°C. Hence, one batch is diluted with furfural, in accordance with the invention, and the other batch, not in accordance with the invention is diluted only with furfuryl alcohol monomer.

These resins are used in the procedure of Example 2 instead of the resin of Example 2, to produce composite test panels approximately 3 feet square at a catalyst level of approximately 3 percent by weight based on the weight of catalyst. The resulting composite panels are observed immediately after formation for the development of hardness, and are tested. In this series of tests, the composite panels including the Mylar sheets, were separated from the metal shaping element in about 1½ hours, and were permitted to cure resting on a flat horizontal plywood support. After 16 hours the Mylar film was separated therefrom. The results of this series of tests are tabulated in Table VI, and results reported under "control laminate" are the results obtained with respect to a composite panel produced entirely in accordance with the procedure of Example 2 herein.

In Table VI the column headed "FAP/FCHO" sets forth the data obtained in the furfural-diluted resin of this example. The data in the column headed "FAP/FA" sets forth the data obtained in connection with the furfuryl alcohol-diluted resin of this example.

Table VI

| Time | Hardness* Binder Control | Development Binder FAP/FCHO | Binder FAP/FA |
|---|---|---|---|
| 1.5 hrs. | 45–55 | 20–30 | Tacky |
| 2.5 " | 55–65 | 35–40 | Tacky |
| 1 day | 84–90 | 82–89 | 69–78 |
| 2 " | R-31 | R-36 | R-10 |
| (within invention?) | (Yes) | (Yes) | (No) |

*"Shore D"; except that those identified as "R" are "Barcol".

From the data of Table VI, it is apparent that the furfural diluted furfuryl alcohol polymer resin produced and utilized in accordance with this invention provides 2 day hardness which is better than the control, although the hardness lagged behind the control up to the 24 hour test. On the other hand, the results observed in connection with the furfuryl alcohol diluted furfuryl alcohol polymer which contains no furfural, and which is therefore not in accordance with the present invention, remained tacky even after 2½ hours, and remained of utterly nonacceptable hardness even after 2 days.

EXAMPLE 6

In another series of illustrations, furfuryl alcohol-furfural-formaldehyde resins, furfuryl alcohol-phenol resins, furfuryl alcohol-urea-formaldehyde resins, and furfuryl alcohol-urea-phenol resins are prepolymerized with oxalic acid, and furfural-phenol resins, with and without formaldehyde, are prepolymerized with calcium hydroxide. All these resins are preadvanced, that is pre-polymerized, to within the viscosity ranges set forth hereinbefore and then, after neutralization, and water removal, are diluted with furfural so that each of the resulting resin-furfural mixtures have viscosities in the range 200–700 cps at 25°C., and have about 25 percent furfural monomer and less than 35 percent furfuryl alcohol monomer. All are tested using the procedure of Example 5 hereinbefore, and the results achieved are entirely satisfactory insofar as acceptable 24 hour hardness and strippability is achieved in the resulting test panels, and no blistering, lamina separation, or the like is encountered during fabrication of the laminate.

EXAMPLE 7

The purpose of this example is to illustrate the high degree of chemical corrosion resistance which is achieved by laminates prepared in accordance with the present invention.

Laminates were prepared as in Example 2 using 3 percent phthaloyl chloride as the spray-up catalyst. After the 3 feet × 3 feet laminates are cured overnight at room temperature, the resulting laminates are cut into quarters and the quarters (1½ inch × 1½ inch) are placed in an oven for 2 hours cure and 180°F. Thereafter, the quartered laminate samples were cut into 2¾ × 3½ inch test specimens the edges of which are sealed with a catalyzed resin coating using the catalyzed resin mixture used in Example 2.

The edges of the individual squares are sealed with the same catalyzed resin mixture used in the fabrication of the laminate by applying small quantities of the catalyzed resin mixture to the edges and forming a rounded bead thereon. This procedure is carried out in such a way that substantially none of the catalyzed resin mixture applied as an edge seal is applied to more than an extremely narrow marginal portion of either face of the small test panel. The edge resin is permitted to cure for about 24 hours at room temperature. Each of the panels is then placed in a respective test liquid medium for cursory corrosion resistance examination and it is noteworthy that both the smooth and rough side of each panel is immersed in the liquid. The media with panel immersed therein is maintained at 150°F. for prolonged periods of time. In Table VII, 18 respective media used in the tests of this example are listed, and the flexural strengths of the panels, when tested by the procedure of ASTM D-790, are tabulated. It is noted that the first column represents the flexural strength achieved at the end of 2 weeks immersion in the respective media at 150°F., and the second column sets forth the flexural strength after 1 month of continuous immersion in the respective medium at 150°F. The initial flexural strength of the test specimens was found to be 14,600.

Table VII

Cursory Corrosion Resistance
18 Media at 150°F.
(ASTM-D-790)

| Media | Flexural Strength, psi 2 Wks. | 1 Mo. |
|---|---|---|
| (initial) | 14,600 | |
| 25% H$_2$SO$_4$ | 16,400 | 17,000 |
| 15% HCl | 15,000 | 16,700 |
| 5% HNO$_3$ | 14,000 | 17,100 |
| 25% Acetic Acid | 15,400 | 17,000 |
| 15% H$_3$PO$_4$ | 17,700 | 15,500 |
| 5% NaOH | 15,100 | 15,700 |
| 10% Na$_2$CO$_3$ | 15,100 | 16,300 |
| Sat. NaCl | 17,200 | 19,000 |
| 95% Ethanol | 15,300 | 17,300 |
| 5% AlK(SO$_4$)$_2$ . 12 H$_2$O | 15,400 | 19,600 |
| Ethyl Acetate | 22,600 | 22,600 |
| MEK | 21,700 | 20,900 |
| Monochlorobenzene | 20,000 | 18,700 |
| Perchloroethylene | 17,800 | 19,000 |
| Heptane | 19,100 | 16,500 |
| Kerosine | 17,800 | 20,000 |
| Toluene | 18,500 | 19,000 |
| Dist. H$_2$O | 16,600 | 16,500 |

It is believed noteworthy that in practically all instances, the flexural strengths increased after the laminate was immersed at 150°F. for 2 weeks, or for 1 month, in the respective media. Only in the case of 5 percent nitric acid was the 2 week strength slightly lower than the initial strength. However, the 1 month flexural strength is in each and every instance higher than the initial flexural strength, even in the case of the nitric acid immersion. Moreover, the flexural strengths of the specimens, in many instances, actually increase between the 2 week and 1 month test.

EXAMPLE 8

The purpose of this Example is to compare the chemical resistance of products of the spray-up method of the present invention to that of specimens made by hand layup techniques.

Three panels were prepared using the resin and procedure set forth in Example 2, except that with respect to the panel identified as Panel A, 1.75 percent phthaloyl chloride catalyst level was used, and the resulting panel, after curing overnight at room temperature, cured for 2 hours at 180°F. Panel B uses the resin and procedure of Example 2 herein, except that the phthaloyl chloride catalyst is used in an amount of 3 percent by weight based on the weight of the resin, and the resulting laminate, after curing overnight at room temperature is cured in an oven for 2 hours at 180°F. Panel C is prepared by a hand layup procedure using the resin of Example 2 catalyzed with 4 percent by weight based on the weight of the catalyzed resin mixture using only aniline hydrochloride as the catalyst. The resulting laminate which is made by applying, by hand, the precatalyzed one-pot resin mixture to the shaping surface, or to the shaping surface-resin-glass web and the glass web is laid on the resin-wet surface and thoroughly worked into the resin by means of a corrugated roller. A laminate is produced similar in glass content, thickness, etc. to the product of Example 2, and is subjected to a cure which comprises 1 hour at 140°, 2 hours in 180°, and 1 hour at 200°F. Panel D is also made by this hand layup procedure. This procedure is exactly the same as the procedure used in making Panel C except that a commercially available furan resin namely "Hetron 800" (T.M.) is used, and the paratoluene sulfonic salt of aniline is used at the 10 percent level as a solid catalyst. The resulting laminate is cured for 1 hour at 140°, 2 hours at 180°, and 1 hour at 200°F. These panels are then subjected to the ASTM-D494-46 "acetone extractables test" and the results of these tests are summarized in TAble VIII.

Table VIII

| Sample | Acetone Extractables ASTM-D-494-46 Percent Acetone Extractable | Percent Glass Content |
|---|---|---|
| A | 3.0 | 31.5 |
| B | 3.5 | 26.5 |
| C | 3.0 | 25.0 |
| D | 5.4 | 26.0 |

It is believed noteworthy that the percent acetone extractable of sample Panels A and B are substantially as good as that achieved using the hand layup procedures of Sample C and are substantially better than the results achieved using hand layup procedure and a different commercial furan resin and different catalyst system (Panel D).

Also, it is believed to be noteworthy that it would be impossible to operate either of the hand layup procedures of Example 8 as a spray-up method inasmuch as a solid catalyst is involved in each instance. However, for the purpose of illustrating the non-applicability of the materials used heretofore in hand layup procedure e.g., aniline hydrochloride catalyst, for spray-up method use, the resin of example 2 was discharged through a spray head as in Example 2 with a solution (50 percent aqueous) of aniline hydrochloride as the catalyst in an amount sufficient to provide 3 percent aniline hydrochloride based on the weight of the catalyzed resin mixture. It was found that the resulting mixture would not cure at room temperature, and, the liquid resin-glass composite would deform, on the surface and flow under gravity. This mixture, which would not cure in a reasonable time at room temperature required substantial degree of heating in an oven in order to affect sufficient cure to substantially solidify the composite layer.

Thus it is apparent from the foregoing that the method of the present invention provides a two-pot spray-up technique for preparing furan-resin reinforced composite, which method is characterized by a room temperature cure of such rate that the resulting shaped composite article is readily strippable from the molds in very short periods of time of less than 24 hours. Also, the method of the present invention used acid chloride catalysts which, surprisingly enough, do not constitute substantial corrosion problems using conventional spray-up equipment. Also, the resulting laminates compare most favorably to, or are better than, hand layup furan resin composite with respect to chemical corrosion resistance. The resulting spray-up laminates have extremely high chemical corrosion resistance; and yet the method of the present invention can take advantage of and utilize commercially available spray-up equipment which has heretofore been limited in its use to non-furan-containing articles.

We claim:

1. A method of making a catalyzed furan binder mixture suitable for spray-up applications, said method comprising: continuously advancing a first liquid binder stream consisting essentially of a furan binder, and a second liquid catalyst stream comprising a catalyst selected from the group o-phthaloyl chloride and lauroyl chloride, and mixtures thereof, said furan binder consisting essentially of a preresinified liquid furan resin having a viscosity between about 500 and 25,000 cps. diluted with furfural in an amount of from about 5–25 percent inclusive by weight based on the weight of the binder, said liquid furan resins having been prepared from ingredients including compounds having one or more furan rings therein, and in which there is no more than one mole of any other respective polymerizable ingredient per mole of furan ring in the furan-ring-containing ingredients, said furan binder having a viscosity in the range between 200 cps. and 1,000 cps inclusive at 25°C.; continuously admixing the binder stream and catalyst stream in relative amounts such that a catalytically effective amount of the catalyst is admixed with said binder whereby a catalyzed binder mixture is formed; immediately discharging the catalyzed binder mixture as a spray into a discharging zone, said catalyst being admixed in an amount of at least 0.5 percent expressed as percent hydrolyzable chloride, based on the weight of the catalyzed binder mixture.

2. The method of claim 1 wherein the acid chloride catalyst is admixed with said binder in an amount sufficient to provide between about 0.5 and 2 percent inclusive hydrolyzable chloride based on the weight of the binder mixture.

3. The method of claim 1 wherein furan resin is a member selected from the group consisting of furfuryl alcohol resin, furfuryl alcohol-formaldehyde resin, furfuryl alcohol-furfural-formaldehyde resin, furfuryl alcohol-urea-formaldehyde resin, furfural-phenol resin, and mixtures thereof.

4. The method of claim 1 wherein the furan binder has a viscosity in the range 200–450 cps inclusive at 25°C.

5. The method of claim 1 wherein the furan binder includes from 0–35 percent inclusive by weight of furfuryl alcohol as a monomer based on the weight of the binder.

6. A method of making catalyzed furan binder mixture suitable for spray-up applications, said method comprising: continuously advancing a first liquid binder stream consisting essentially of a furan binder, and a second liquid catalyst stream comprising a catalyst selected from the group o-phthaloyl chloride and lauroyl chloride, and mixtures thereof, said furan binder consisting essentially of a pre-resinified liquid furan resin diluted with furfural in an amount of from about 5–25 percent inclusive by weight based on the weight of the binder said binder having a viscosity between 200 and 1,000 cps. inclusive at 25°C. said liquid furan resin having been prepared from including compounds having one or more furan rings therein, and in which there is no more than one mole of any other respective polymerizable ingredient per mole of furan ring in the furan ring-containing ingredients, and wherein said liquid furan resin comprises a furfuryl alcohol-formaldehyde resin having an initial ingredient formaldehyde-furfuryl alcohol ratio between about 0.20 and 0.60 moles of formaldehyde per mole of furfuryl alcohol, and wherein said pre-resinified liquid furan resin has been prepolymerized by an acid catalyst to such an extent that, after neutralization of the catalyst and stripping of substantially all the water and low-boiling constituents therefrom, the resulting prepolymerized resin has a viscosity in the range between 200 cps, and 1,000 cps. inclusive at 25°C.; continuously mixing the binder stream and catalyst stream in relative amounts such that a catalytically effective amount of the catalyst between 0.5 and 2.0 percent hydrolyzable chloride based on the weight of the resulting catalyzed binder mixture is admixed with said binder whereby a catalyzed furan binder mixture is formed; immediately discharging the resulting catalyzed binder mixture is a spray into a discharge zone.

7. The method of claim 6 wherein the furan binder has a viscosity in the range 200–450 cps inclusive at 25°C.

8. The method of claim 6 wherein the furan binder includes from 0–35 percent inclusive of furfuryl alcohol as monomer based on the weight of the binder.

9. A method of making a catalyzed furan binder mixture suitable for spray-up applications, said method comprising: continuously advancing a first liquid binder stream consisting essentially of a furan resin binder, and a second liquid catalyst stream comprising a catalyst selected from the group o-phthaloyl chloride and lauroyl chloride, and mixtures thereof, said furan binder consisting essentially of a pre-resinified liquid furan resin diluted with furfural in an amount of from about 5–25 percent inclusive by weight based on the weight of the binder, said liquid furan resin having been prepared from ingredients including compounds having one or more furan rings therein, and in which there is no more than one mole of any other respective polymerizable ingredient per mole of furan ring in the furan-ring-containing ingredients, said furan binder having a viscosity in the range between 200 cps and 1,000 cps inclusive at 25°C.; continuously admixing the binder stream and catalyst stream in relative amounts such that a catalytically effective amount of the catalyst is admixed with said binder whereby a catalyzed binder mixture is formed said catalyst being added in an amount of at least 0.5 percent expressed as percent hydrolyzable chloride, based on the weight of the catalyzed binder mixture; immediately discharging the catalyzed binder mixture as a spray into a discharging zone, wherein, saif furan resin is a member selected from the group consisting of furfuryl alcohol resin, furfuryl alcohol-formaldehyde resin, furfuryl alcohol-furfural-formaldehyde resin, furfuryl alcohol-urea-formaldehyde resin, furfural-phenol resin, and mixtures thereof, and wherein said furfuryl alcohol resin, furfuryl alcohol-formaldehyde resin, and furfuryl alcohol-furfural-formaldehyde resin are prepolymerized by means of an acid catalyst to such an extent that, after neutralization of the catalyst and stripping of water and low-boiling constituents therefrom, the resulting viscosity of the prepolymerized liquid resin is in the range between 10,000 and 25,000 cps inclusive at 25°C.; wherein said furfuryl alcohol-urea-formaldehyde resin is prepolymerized by an acidic catalyst to such an extent that, after neutralization of the catalyst and after stripping of water and low-boiling constituents therefrom, the resulting viscosity is in the range between about 500 and 1,000 cps inclusive at 25°C.; and wherein the furfural-phenolic resin with or without formaldehyde present, is prepolymerized to such an extent using an alkaline catalyst that, after the catalyst is neutralized, and water and low-boiling constituents are stripped therefrom, the resulting viscosity of the prepolymerized resin is in the range between about 500 and 10,000 cps inclusive at 25°C.

* * * * *

UNITED STATES PATENT OFFICE
CERTIFICATE OF CORRECTION

PATENT NO. : 3,927,139

DATED : December 16, 1975

INVENTOR(S) : Keith B. Bozer and Lloyd H. Brown

It is certified that error appears in the above-identified patent and that said Letters Patent are hereby corrected as shown below:

Column 10, line 61 "3/4 inch-1/2 inch" should read --3/4 inch-1-1/2 inch--.

Column 13, line 59 "one's fiber" should read --one's finger--.

Column 17, line 63 "1-1/2 inch x 1-1/2 inch" should read --1-1/2'x1-1/2'--.

Column 19, line 10 after "by weight" insert the word --catalyst--.

Claim 6, column 21, line 35 "is" should read --as--.

Signed and Sealed this eighteenth Day of May 1976

[SEAL]

Attest:

RUTH C. MASON
Attesting Officer

C. MARSHALL DANN
Commissioner of Patents and Trademarks